UNITED STATES PATENT OFFICE.

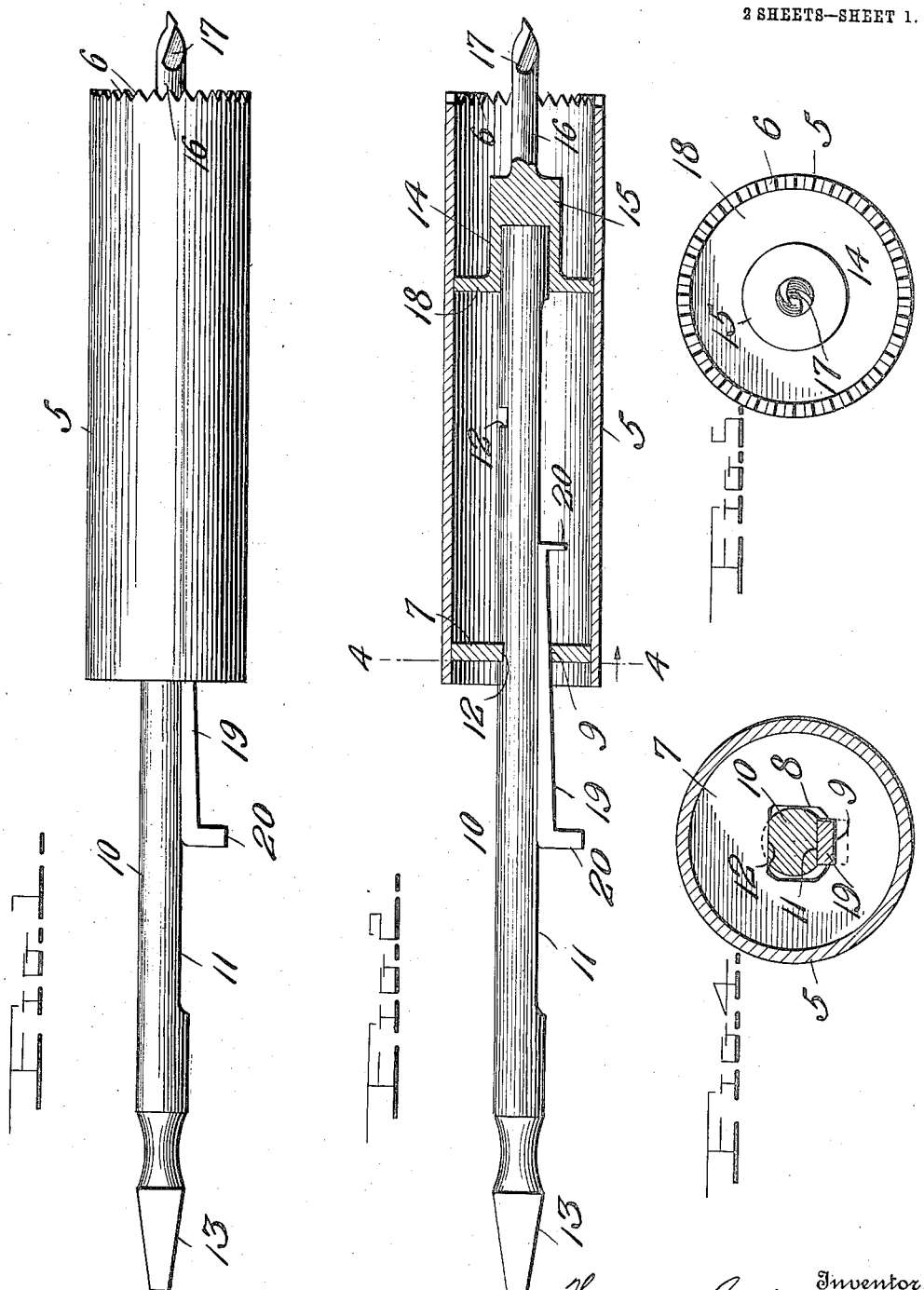

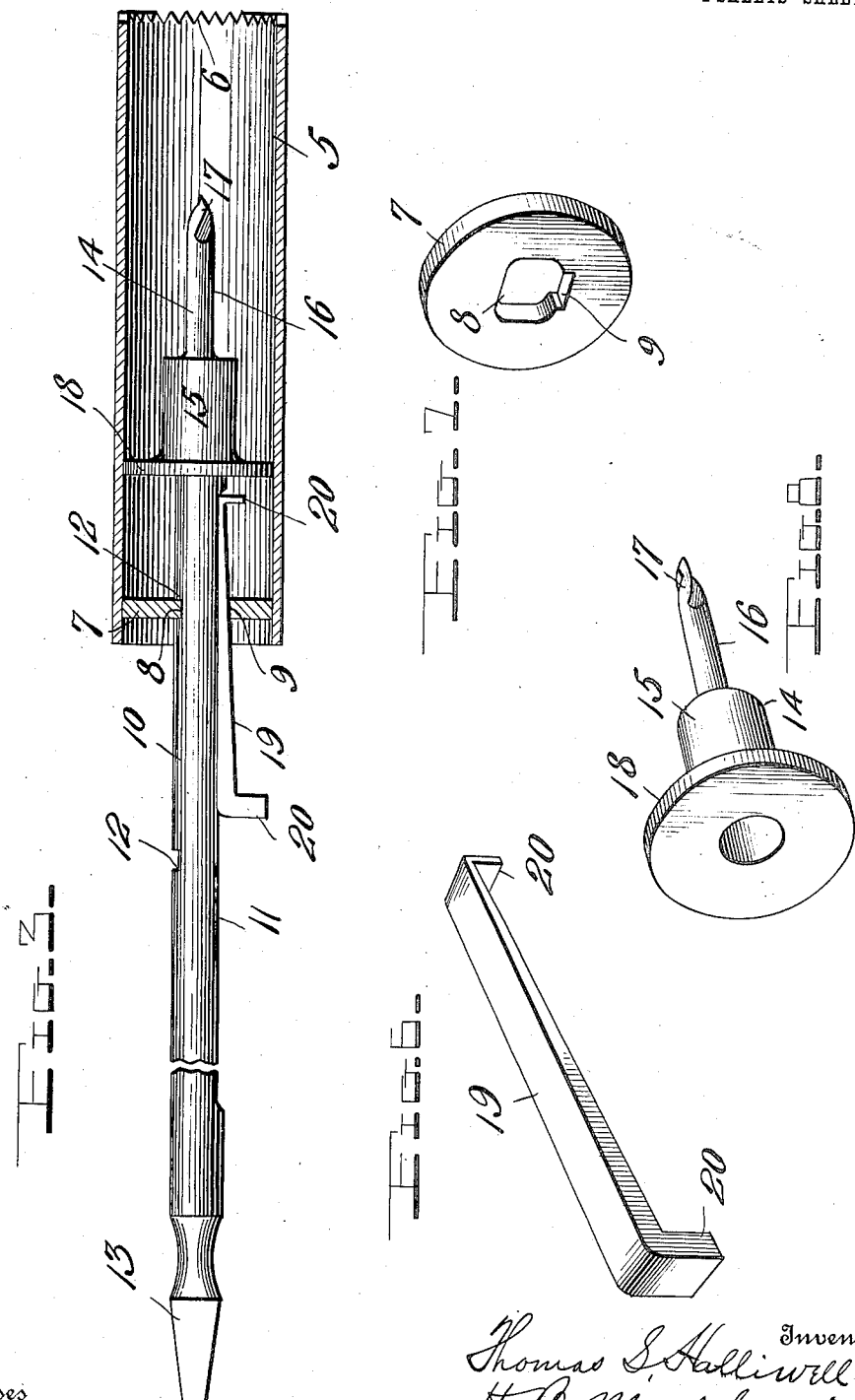

THOMAS S. HALLIWELL AND HENRY B. MASCHMEIER, OF DENVER, COLORADO.

BORING-TOOL.

958,112.  Specification of Letters Patent.  Patented May 17, 1910.

Application filed December 14, 1909. Serial No. 533,064.

*To all whom it may concern:*

Be it known that we, THOMAS S. HALLIWELL and HENRY B. MASCHMEIER, citizens of the United States, residing at Denver, in the county of Denver and State of Colorado, have invented certain new and useful Improvements in Boring-Tools, of which the following is a specification, reference being had to the accompanying drawings.

This invention relates to certain new and useful improvements in boring tools and has for its object to provide a very simply constructed tool of this character which is highly efficient in its operation and whereby the boring of walls may be greatly facilitated.

Another object is to provide means whereby the tool may be readily started to secure the proper engagement upon the wall or other surface being operated upon, and the starting device then withdrawn from engagement with the wall and the boring element proper brought into operation.

With these and other objects in view, the invention consists of the novel features of construction and the combination and arrangement of parts hereinafter fully described and claimed, and illustrated in the accompanying drawings, in which—

Figure 1 is a side elevation illustrating a boring tool constructed in accordance with the present invention; Fig. 2 is a longitudinal section thereof; Fig. 3 is a similar view showing the position of the starting bit after the engagement of the boring cylinder with the wall; Fig. 4 is a section taken on the line 4—4 of Fig. 2; Fig. 5 is an end view of the tool; Fig. 6 is a detail perspective view of the locking wedge; Fig. 7 is a similar view of the shank receiving collar or head; and Fig. 8 is a detail perspective view of the starting bit.

Referring to the drawings 5 indicates the cylindrical body or boring member which is provided upon its outer end with the teeth 6 preferably in the form of saw teeth which are adapted to cut into the material in the operation of the tool. Within the tubular boring member adjacent the opposite end thereof a collar 7 is rigidly secured and is provided with a central rectangular opening 8 in one edge of which a recess 9 is formed. A shank 10 of cylindrical form extends through this rectangular opening and is provided with the flattened longitudinal face 11. The shank 10 is also formed oppositely to the flat face 11 with the recesses 12. These recesses are suitably spaced from each other and are adapted to engage over the edge of the opening 8 in the head plate 7 and upon the opposite side thereof to the recess 9. The outer end of the shank 10 is formed with the usual reduced portion 13 which is adapted to be secured in a suitable brace (not shown). Upon the opposite or inner end of the shank 10 a starting bit 14 is brazed or otherwise secured. This bit comprises the body portion 15 and the reduced extension 16, the extremity of which is conically formed and provided with the cutting teeth 17. Upon the inner end of the body 15 of the bit, a guide collar 18 is formed and engages with the inner wall of the cylindrical boring member 5.

In order to secure the shank 10 in the collar or head plate 7 against longitudinal movement, we provide the locking bar 19 which is formed at each end with the lateral extensions 20. This bar is disposed upon the flattened face 11 of the shank and is positioned in the recess 9 of the opening 8. The shank is moved through the opening in the operation of the tool until one of the recesses 12 is disposed over the edge of the opening and upon the opposite faces of the head plate. The wedge bar 19 is then driven securely into the boring member 5 and between the shank and the recess 9, thus wedging the shank upon the opposite side of the opening 8 and securely locking the same in position so that the starting bit will be rigidly held against inadvertent longitudinal movement.

In the operation of the tool the starting bit is arranged in the member 5, as shown in Fig. 2, wherein it will be noted that the toothed conical end thereof is disposed beyond the toothed end 6 of the boring member. The end 13 of the shank is, of course, secured in the brace and upon operating the same, it will be obvious that the starting bit will bite into the wall or other surface and as it moves inwardly the teeth of the member 5 will also be brought into engagement with the wall surface. Thus, the main boring member will be given the proper start so that it will readily take hold of the wall and cut its way into the material. When the cutting action has been started and the member 5 is securely engaged with the wall surface, the locking bar 19 may be struck outwardly releasing the shank 10 so that the same may be moved through the opening 8. In this manner, the starting bit may be released from engagement with the wall and drawn outwardly and into the tubular boring member 5, as shown in Fig. 3. The other of the recesses 12 in the shank will be thus brought into engagement with the edge of the opening 8 in the head plate and the wedge bar will be again driven between the recess 9 and the flattened face of the shank to lock the starting bit in its inoperative position.

From the foregoing it will be seen that we have produced a tool of comparatively simple construction which may be easily and quickly operated and is well adapted for the purpose in view. Considerable difficulty is often experienced in getting the proper start or purchase for the boring member, and by means of our improved starting bit the initial cutting action of the tool is materially facilitated, and when its starting function is no longer necessary it may be easily withdrawn into the tubular member 5 and rigidly held therein against movement. It will, likewise, be obvious that owing to the simplicity of construction of our improved tool, the same may be produced at a very low cost.

While we have shown and described the preferred embodiment of our invention, it will, of course, be understood that numerous minor modifications may be resorted to without departing from the essential features or sacrificing any of the advantages thereof.

Having thus described the invention what is claimed is:

1. A tool of the character described comprising a tubular boring member, a shank longitudinally movable in said member, a starting bit carried by said shank, a guide carried by the bit engaged with the inner wall of said boring member, said bit being adapted to be positioned beyond the end of the main boring member to start the boring operation, and means engaged with the shank to lock the bit in its extended position.

2. A tool of the character described comprising a cylindrical tubular boring member having cutting teeth formed on its outer end, a head arranged in the inner end of said member, a cylindrical shank movable through said head having a flattened face, a starting bit carried by said shank having a collar integrally formed therewith engaged with the inner periphery of the boring member, said starting bit being adapted for longitudinal movement in said member to move the same to its operative and inoperative positions, and a locking bar positioned between the flattened face of said shank and said head to lock the starting bit in either of such positions.

3. A tool of the character described comprising a cylindrical tubular boring member, a head rigidly secured in one end of said member, a cylindrical shank movable through said head, a starting bit carried by said shank and adapted to be positioned beyond the cutting end of said boring member to start the boring operation and means extending into said tubular boring member adapted to lock said shank in the head.

4. A tool of the character described comprising a cylindrical tubular boring member having a head rigidly secured in one end thereof, said head being formed with a central opening therein, a cylindrical shank movable through said opening, a starting bit carried on said shank and movable within said boring member, said shank having spaced recesses therein adapted to engage over the edge of the opening in said head, and a locking bar positioned through the opening in said head and engaged with said shank adapted to lock said starting bit within the head in its operative or inoperative positions.

5. A tool of the character described comprising a cylindrical boring member, a head rigidly secured in one end of said member provided with a central rectangular opening, a cylindrical shank longitudinally movable through the opening in said head, a starting bit secured on the inner end of said shank and movable within said boring member, said bit having a collar formed integral therewith engaging with the inner periphery of said member, said shank having spaced recesses adapted to engage over the edge of the opening in said head, and a locking bar disposed between the opposite side of said shank and the edge of said opening to secure the starting bit in either its operative or inoperative position.

6. A tool of the character described comprising a cylindrical boring member, a head rigidly secured to one end thereof having a central rectangular opening and a recess formed in one edge of said opening, a cylindrical shank movable through said opening, a starting bit carried by said shank having a guide flange integrally formed therewith engaging with the inner periphery of the boring member, said shank having spaced recesses adapted to be engaged over one edge of said opening and a longitudinal flattened face positioned opposite to the recess in said opening, and a wedge-shaped locking bar positioned in said recess and engaging with the flattened face of said shank to secure said starting bit in its operative or inoperative positions.

7. A tool of the class described, comprising a tubular boring member having cutting teeth on one end, a head rigidly secured in the other end of said member having a rectangular opening therein and a recess in one edge of said opening, a cylindrical shank movable through said opening, a starting bit secured on the inner end of said shank longitudinally movable within said boring member, and adapted to be extended beyond the end thereof, said shank having a longitudinal flattened face disposed opposite to the recess of said opening and a wedge-shaped locking bar positioned in said recess and extending into the boring member having its ends laterally disposed, said member being adapted to lock said starting bit in its operative or inoperative positions.

In testimony whereof we hereunto affix our signatures in the presence of two witnesses.

THOMAS S. HALLIWELL.
HENRY B. MASCHMEIER.

Witnesses:
CHRIS EVANS,
JOHN VASLIE.